United States Patent
Gottfried, Jr.

(10) Patent No.: US 6,232,671 B1
(45) Date of Patent: May 15, 2001

(54) FLYWHEEL ENERGY STORAGE APPARATUS WITH BRAKING CAPABILITY

(76) Inventor: Mario Gottfried, Jr., Las Flores 278, Mexico City, D.F. (MX)

(*) Notice: Subject to any disclaimer, the term of this patent is extended or adjusted under 35 U.S.C. 154(b) by 0 days.

(21) Appl. No.: 09/303,929

(22) Filed: May 3, 1999

(51) Int. Cl.⁷ .................................................. H02P 9/04
(52) U.S. Cl. ......................... 290/1 R; 290/1 A; 290/1 C; 290/4 R; 290/15; 310/74
(58) Field of Search ..................... 290/1 A, 1 R, 290/74, 1 J; 310/74

(56) References Cited

U.S. PATENT DOCUMENTS

| | | |
|---|---|---|
| 2,734,383 | 2/1956 | Paine . |
| 3,329,375 | 7/1967 | Kurzhals et al. . |
| 3,424,401 | 1/1969 | Maurer . |
| 4,088,041 | 5/1978 | Kraus . |
| 4,198,878 * | 4/1980 | Lewis et al. ............................ 74/572 |
| 4,207,778 * | 6/1980 | Hatch ..................................... 74/572 |
| 4,211,452 | 7/1980 | Poubeau . |
| 4,223,240 | 9/1980 | Theyse . |
| 4,230,294 | 10/1980 | Pistiner . |
| 4,498,015 | 2/1985 | Gottfried . |
| 4,629,947 * | 12/1986 | Hammerslag et al. .............. 318/161 |
| 4,961,352 * | 10/1990 | Downer et al. ....................... 74/5.46 |
| 5,065,060 * | 11/1991 | Takahashi et al. .................... 310/74 |
| 5,559,381 * | 9/1996 | Bosley et al. .......................... 310/34 |
| 5,714,812 * | 2/1998 | Koenck et al. ........................ 310/74 |
| 5,760,506 * | 6/1998 | Ahlstrom et al. ..................... 310/74 |
| 5,760,508 * | 6/1998 | Jennings et al. ...................... 310/74 |
| 5,767,595 * | 6/1998 | Rosen .................................... 310/74 |
| 5,920,138 * | 8/1999 | Clifton et al. ...................... 310/90.5 |
| 5,925,952 * | 7/1999 | Bichler et al. ........................ 310/74 |
| 5,931,249 * | 8/1999 | Ellis et al. ............................ 180/165 |

\* cited by examiner

*Primary Examiner*—Elvin Enad
(74) *Attorney, Agent, or Firm*—Harrison & Egbert (57) ABSTRACT

An energy storage apparatus for a vehicle having a housing resiliently mounted in the vehicle, a first plurality of flywheels rotatable about a first axis within the housing, a second plurality of flywheels rotatable about a second axis within the housing, a third plurality of flywheels rotatable about a third axis within the housing, an energy input mechanism connected to at least one of the flywheels for initiating and maintaining rotational movement of the flywheels, and an output mechanism for converting the rotation of the flywheels into potential energy. Each of the flywheels of the first, second and third pairs are rotatable in opposite directions. Each of the axes are perpendicular to each other. A cradle is connected to the vehicle so as to receive the housing within the cradle. This flywheel system is designed to be safe, yet portable, as an electro-mechanical battery.

8 Claims, 8 Drawing Sheets

FLYWHEEL ENERGY STORAGE APPARATUS WITH BRAKING CAPABILITY

TECHNICAL FIELD

The present invention relates to kinetic energy storage systems for use in moving vehicles. More particularly, the present invention relates to energy storage systems utilizing an arrangement of three counter-rotating pairs of electromechanical flywheels for reducing and minimizing gyroscopic effects upon the moving vehicle. Furthermore, the present invention relates to operating portable flywheel energy storage systems which includes an automatic braking capability, shock absorption and expansion containment to avoid or contain flywheels that "burst" during accidents.

BACKGROUND ART

While flywheels are well known in the art, there has been very little application of flywheels in moving vehicles. Some flywheels have been used in automobile engines to smooth out the pulses of energy provided by the exploding gases in the cylinders and to provide energy for the compression stroke of the pistons. However, flywheels have seldom been used for storage of kinetic energy within the automobile.

The reason for the lack of usage of flywheels as kinetic energy storers in automobiles has been the gyroscopic effect of the flywheel upon the maneuverability of the vehicle. A spinning flywheel produces a strong gyroscopic effect; in other words, the flywheel strongly opposes the turning of the vehicle. This gyroscopic effect is magnified where the flywheel is either large or spinning at high speeds.

It is highly desirable to utilize flywheel systems to store kinetic energy in moving vehicles since they can be loaded and energy drawn many times. For example, a train equipped with a kinetic energy storing flywheel could conserve a significant portion of that energy which was lost upon stopping the train. Similarly, the energy wasted in stopping an automobile could also be conserved and applied to accelerating the automobile or supplying the automobile with electrical power. Such a kinetic energy storage system could have vast application in the field of electric automobiles or other electrically powered vehicles.

The gyroscopic effect of a single flywheel arrangement clearly prohibits its widespread use as a kinetic energy storer in vehicles. If a single flywheel system were used to store much of the kinetic energy lost during the stoppage of a train, then the gyroscopic effect of the spinning flywheel could cause a train to derail every time it would go around a curve. Thus, it would be desirable to use a flywheel kinetic energy storing system without having to endure the undesirable characteristics of the gyroscopic effect.

One significant effort to achieve these benefits was found in U.S. Pat. No. 4,498,015, which issued on Feb. 5, 1985, to the present inventor. This device was a flywheel device for a moving vehicle that comprised a plurality of flywheel systems connected in such a manner as to minimize the gyroscopic effects of the flywheels. These flywheels were arranged such that they spin in axes that are ninety degrees from each other. In one embodiment of the invention, this was accomplished by attaching each flywheel to a separate shaft extending through opposing sides of a closed container. One shaft extends from the top to the bottom, another from side to side along the length of the enclosure, and the third from side to side along the width of the enclosure. Each of the shafts is freely rotatable within a ball bearing arrangement mounted in each side of the enclosure. The shafts are geared into one another such that the equally sized flywheels will spin at the same rate. This patent further proposed an alternative embodiment in which each of the flywheels was the rotor in an electric motor. The flywheel-rotor included integrated windings, magnets, and stator cores. Additionally, other techniques can be used such as hydraulic motor generators or pneumatic motor generators. The axes of these motors are arranged so as to be ninety degrees from each other. The electric motors were rigidly attached at a central area between them.

Unfortunately, this arrangement of flywheels was often difficult to configure so that all of the gyroscopic effects were eliminated. After a great deal of experimentation, it was found that the rotational movement of the flywheel, along each of the axes, still contributed gyroscopic effects. As such, a solution needed to be found as to how the minimize the gyroscopic effects along each axis.

In U.S. Pat. application Ser. No. 08/304,520, filed on Sep. 12, 1994, by the present inventor, and entitled "FLYWHEEL ENERGY STORAGE APPARATUS", presently pending, a system was described which minimizes gyroscopic effects from the rotational movement of the flywheels. In particular, this system is an energy storage apparatus that has a housing, a pair of flywheels rotatable about a first axis within the housing, a second pair of flywheels rotatable about a second axis within the housing, a third pair of flywheels rotatable about a third axis within the housing, and an energy input means connected to at least one of the flywheels for initiating and maintaining rotational movement of the flywheels. An output energy device serves to convert the rotation of the flywheels into potential energy. Each of the first pair of flywheels rotates in opposite directions. Each of the second pair of flywheels is rotatable in opposite directions. Finally, each of the third pair of flywheels is rotatable in opposite directions. Each of the axes of the flywheel pairs are perpendicular to each other.

In this system, the energy input means was a motor-generator connected to each of the flywheels of the first, second and third pairs. Each of the flywheels has a shaft which extends centrally therefrom. The shaft is rotatable with the rotation of each of the flywheels. The motor-generator is connected to the shaft. In this system, the housing has a configuration of a sealed cube. Each of the flywheels is located adjacent a side of the cube. The housing has an interior which is maintained in a vacuum condition.

After experiments with the present invention, it was found that this invention strongly minimized the gyroscopic effects of the flywheels in the system. However, in actual use, there was the danger of injury caused by the flywheels spinning at a high speed. Under certain circumstances, in the event of an automobile accident or a collision when the flywheel disintegrates or bursts, pieces of the flywheel could come off of the spinning flywheel. The high speed at which the flywheel rotated created a dangerous condition whereby the flying pieces became the equivalent of flying shrapnel. As such, a need developed so as to create such an energy storage apparatus in which each of the flywheel components would automatically brake in the event of a collision.

It is further noted that with these prior systems, it is important to be able, under certain circumstances, to absorb the energy produced by such an apparatus. Adverse effects could be created by rigidly and fixedly mounting the housing of such an energy storage apparatus directly to a vehicle. The strong forces imparted by such a device could damage the structural integrity of the vehicle. Additionally, the flywheels housed in a cubic frame, when used in vehicles, are subject to possible disintegration or damage due to road shock and vibration. Such road shocks and vibrations must be absorbed in order to reduce any threat of damage to the flywheels, especially at higher vehicle and flywheel speeds. As such, a need developed so as to be able to reduce the shock and fatigue caused by the energy from road vibration and the shocks of bumps, holes and rocks as received by the vehicle during the normal driving movement of the vehicle.

It is an object of the present invention to provide an energy storage apparatus which reduces and minimizes gyroscopic effects.

It is a further object of the present invention to provide a long life energy storage apparatus that can be utilized within vehicles without diminishing the maneuverability of the vehicle.

It is still a further object of the present invention to provide an energy storage apparatus that allows for the production of electrical energy, rather than mechanical energy.

It is another object of the present invention to provide a flywheel energy storage apparatus in which the system automatically brakes in the event of a compression or collision.

It is another object of the present invention to provide a flywheel energy storage apparatus which minimizes interior friction.

It is a further object of the present invention to provide a flywheel energy storage apparatus which avoid the release of shrapnel from the interior of the device.

It is still a further object of the present invention to provide a flywheel energy storage device which maintains a vacuum condition on the interior of the device.

It is still a further object of the present invention to provide a flywheel energy storage apparatus which reduces the effect of road shock and vibration upon the flywheel system.

It is another object of the present invention to provide a flywheel system which operates with other flywheel systems, other batteries or other engines.

These and other objects and advantages of the present invention will become apparent from a reading of the attached specification and appended claims.

SUMMARY OF THE INVENTION

The present invention is an energy storage apparatus that comprises a cubic or spherical housing, a first pair of flywheels rotatable about a first axis within the housing, a second pair of flywheels rotatable about a second axis within the housing, a third pair of flywheels rotatable about a third axis within the housing, an energy input means connected to at least one of the flywheels for initiating and maintaining rotational movement of the flywheels, and an output means for converting the rotation of the flywheels into potential energy. Each of the first pair of flywheels is rotatable in opposite directions. Each of the second pair of flywheels is rotatable in opposite directions. Each of the third pair of flywheels is rotatable in opposite directions. Each of the axes are perpendicular to each other.

The energy input means is a motor-generator connected to each of the flywheels of the first, second, and third pairs. Each of the flywheels has a shaft extending centrally therefrom. The shaft is rotatable with the rotation of each of the flywheels. The motor-generator is connected to the shaft. Specifically, the shaft has stampings extending outwardly therefrom. The housing has windings positioned in proximity to the stampings. The output means is connected to these windings.

The housing has a configuration of a sealed cube. Each of the flywheels is adjacent a side of the cube. Specifically, the housing has an interior maintained in a vacuum condition.

Each of the flywheels has a conicoid configuration. A wide end of each of these flywheels is adjacent to a wall of the housing. Each of the flywheels is rotatable at similar speeds as the other flywheels. Additionally, each of the flywheels is of a similar weight as the weight of the other flywheels. Each of the flywheels is formed of a laminated configuration of plastic and/or steel rings. A set of magnetic bearings serves to cause each of the flywheels to rotate about their respective shafts more freely without contacting an adjacent flywheel. In the event of a collision or a destruction of the housing of the flywheel configuration, the forces imparted on the flywheels will cause the center of the support system to yield to the forces to be overcome so that the respective flywheels will come into contact with one another at their smallest diameter so as to establish automatic braking of the system. The housing is designed so that in the event of a collision, and, consequently, in the event of a burst, the weaker side, such as the top and/or bottom of the housing, will open so that any flying debris will fly in a desired direction. The remaining housing portion will prevent any flying parts or expansion of the housing from being directed into the passenger compartment of a vehicle.

In an alternative form of the present invention, the laminated or layered ring configuration of the flywheels is arranged such that the innermost rings are designed so as to break free and spin against other flywheels and/or stationary sections prior to the disintegration of the flywheel itself. As such, in the event of the destruction of the flywheels, in a burst, the frame will resist the explosion by expanding relative to the force. In another form of the present invention, a stainless steel mesh is provided or molded into plastic walls of the frame of the energy storage apparatus so as to "flex" or expand in the event of an explosion. In another form of the present invention, a cable is wrapped around the exterior of the walls of the energy storage device so as to provide expansion or stretch in the event of a disintegration of the flywheels. In another form of the present invention, the flywheel energy storage device is dipped in latex material so as to retain the vacuum condition on the interior of the energy storage device and provide a further expansion mechanism.

In order to isolate the energy storage apparatus and the associated flywheels from shocks and vibration caused by movement of a vehicle on a road, the present invention includes a cradle which is connected to the vehicle and which receives the housing therein. The cradle is mounted to the vehicle by a fastener with an elastomeric member interposed between the cradle and the vehicle. In a particular form of the present invention, the cradle has a rigid well formed on an exterior surface thereof so as to receive the elastomeric member therein. A spring extends from the cradle and engages the housing so as to suspend the housing within the cradle such that the walls of the housing do not contact the walls of the cradle. A shock absorbing container may be interposed between the wall of the housing and the wall of the cradle.

In a particular form of the present invention, the cradle will have a cubical configuration of a single flywheel arrangement with a frame formed of a rigid material. The cradle has walls affixed to the frame. These frames are of a flexible and generally impenetrable material.

To further isolate the energy storage apparatus from road shock and vibration, each of the flywheels is rotatably mounted on a magnetic bearing. The magnetic bearing is affixed within an elastomeric lining on a wall of the housing. A pin is positioned centrally of the magnetic bearing. The flywheel has a jewel positioned centrally thereof so as to ride in close proximity over and around the pin. The pin has an elastomeric frame extending therearound. The jewel is suspended in an elastomeric frame in the flywheel. Also, in the present invention, each of the flywheels can comprise a plurality of rings arranged concentrically with respect to each other. In the case of an accident, strong collision or blow, in conjunction with the braking mechanism, each of the rings can be slippable in rotation and lose energy with respect to an adjacent ring. Further these rings can spring out of the center of rotation and rub against the inside walls of the frame so as to further decelerate due to friction.

DETAILED DESCRIPTION OF THE INVENTION

Figures 1, 2:
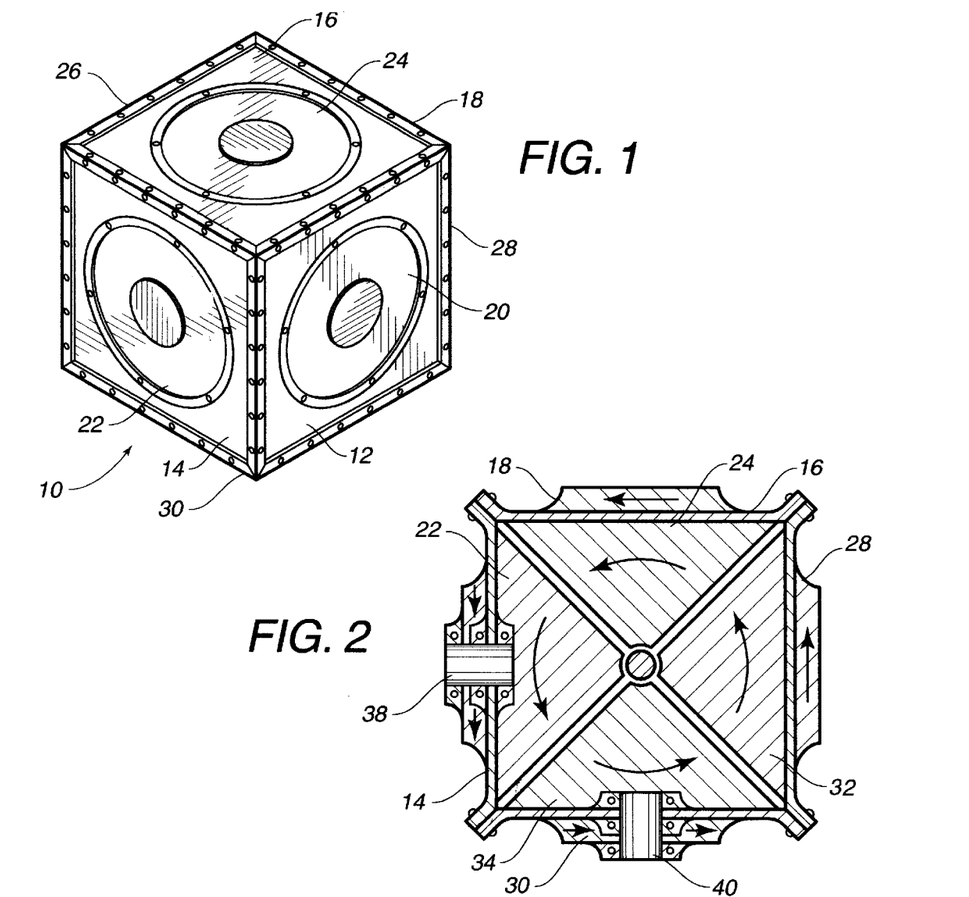
FIG. 1 is a perspective view of the energy storage apparatus in accordance with the present invention.
FIG. 2 is a frontal cross-sectional view of the energy storage apparatus of the present invention.

Referring to FIG. 1, there is shown at 10 the energy storage apparatus in accordance with the preferred embodiment of the present invention. As illustrated in FIG. 1, the side walls 12, 14, and 16 of the energy storage apparatus 10 are illustrated as clear. It can be seen that the walls 12, 14, and 16, along with those walls not illustrated, form the housing 18 for the energy storage apparatus 10 of the present invention. The housing 18 has the configuration of a sealed cube. It can be seen that each of the flywheels 20, 22, and 24 are adjacent to sides 12, 14 and 16, respectively, of the housing 18. The interior of the housing 18 should be in a vacuum condition so as to minimize any friction through the rotation of the flywheels 20, 22, and 24 within the interior of the housing 18. This vacuum condition can be created by the use of a commercial vacuum pump acting on the interior of housing 18.

The housing 18, along with its associated components, is to be positioned within the interior of a vehicle. The energy storage apparatus 10 of the present invention is contemplated for use in conjunction with a bus. However, all vehicles or vessels can be included, including spacecraft. The energy storage apparatus 10 of the present invention would work best in space due to the vacuum condition of space itself.

In the present invention, a six-sided cube of flywheels is contemplated. As such, it can be seen that each of the flywheels 20, 22 and 24 face in directions perpendicular to each other. Each of the flywheels 20, 22 and 24 rotate about axes which are perpendicular to each other. In the concept of the present invention, flywheels can also face the other sides of the housing 18. In other words, another flywheel will face the back side 26 of housing 18 opposite the flywheel 20. A flywheel will face the side 28 opposite flywheel 22. Another flywheel will face the bottom 30 of the housing 18 opposite flywheel 24. The flywheel 20 and the flywheel at the back 26 will rotate about the same axis but will rotate in opposite directions. The flywheel 22, and the flywheel at the side 28, will rotate about the same axis but will rotate in opposite directions. Finally, the flywheel 24, and the flywheel at the bottom 30, will rotate about the same axis but in opposite directions. These flywheels, opposite each other on the same axis, turn in the opposite direction so as to the gyro-neutral characteristics obtained in a three-dimensional configuration. Counter-rotating flywheels are known to neutralize certain gyroscopic effects on the same plane. The energy storage apparatus 10 serves to make gyro-neutral all movement aspects of the entire assembly. The gyro-effects are transferred to the enclosure, to the bearings, and to the shafts of each plane of flywheel axis. As a result, a vehicle connected to the energy storage apparatus 10 will be free of gyro-limitations.

FIG. 2 shows a cross-sectional view of the energy storage apparatus 10 of the present invention. Importantly, it can be seen that the flywheel 24 extends so as to be adjacent to the top side 16 of the housing 18. Another flywheel 32 is positioned adjacent to the sidewall 28 of housing 18. A flywheel 34 is directed toward the bottom wall 30 of the housing 18. Finally, flywheel 22 is positioned adjacent to the side wall 14 of housing 18. Each of the flywheels 22, 24, 32, and 34 have a conicoid configuration. By "conicoid" configuration, it is meant that the flywheels have a bow-shaped, half-rounded, or conical configuration. The wide end of this configuration is adjacent to the respective side walls. It is believed that this conicoid configuration of the flywheels maximizes the kinetic energy storage ability of each of the flywheels within the housing 18. Additionally, the conicoid configuration allows six flywheels to be received within the cube-shaped housing 18.

In FIG. 2, it can be seen that the flywheels 22 and 32 are co-axial, but rotate in opposite directions. Similarly, it can be seen that the flywheels 24 and 34 are co-axial, but rotate in opposite directions.

The flywheel 22 is mounted on a shaft 38. The shaft 38 extends into the side wall 14 of the housing 18. Similarly, in FIG. 2, it can be seen that the flywheel 34 is mounted on a shaft 40. Shaft 40 extends into the bottom wall 30 of the housing 18. The flywheels 22 and 32 are mounted in a similar fashion. Although the flywheels 22 and 32 are in a co-axial arrangement, they are not connected to the same shaft. Similarly, the flywheels 24 and 34 are not connected to the same shaft.

Figure 3:
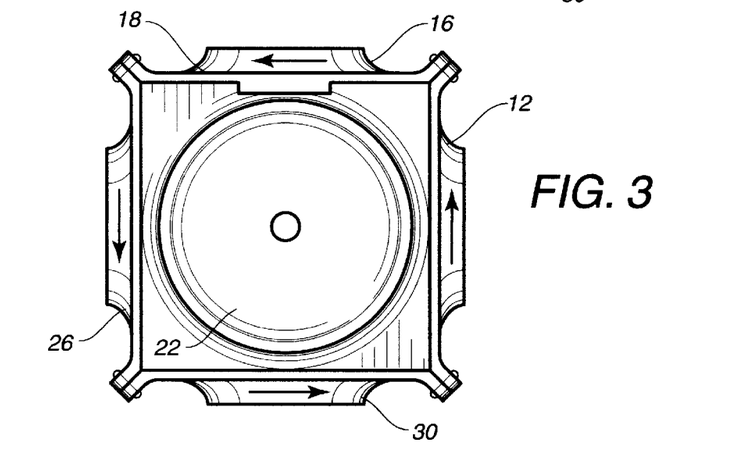
FIG. 3 is a side view of the energy storage apparatus of the present invention.

FIG. 3 is an illustration of the energy storage apparatus 10 of the present invention that is viewed at the side wall 14. It can be seen that the flywheel 22 is positioned rotatably at the side wall. It is further illustrated that the flywheel 20 rotates in one direction and another flywheel at the back wall 26 rotates in the opposite direction. Similarly, it is illustrated in FIG. 3, that the flywheel 24, at the top side 16, rotates in an opposite direction than the flywheel located at the bottom side 30.

Figure 4:
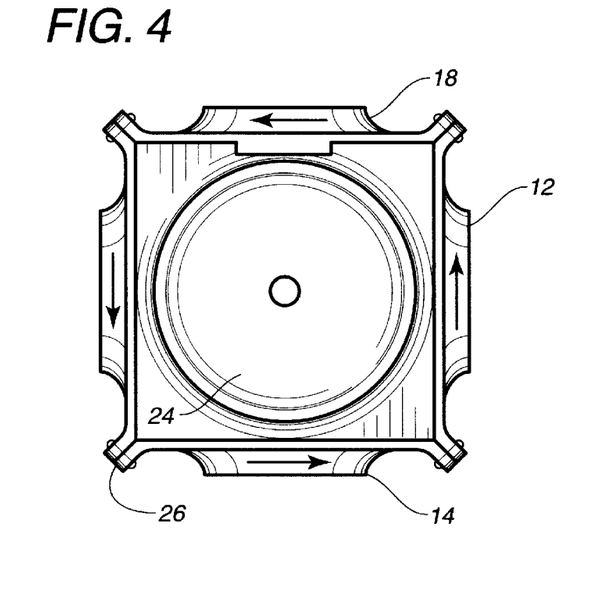
FIG. 4 is a plan view of the energy storage apparatus of the present invention.

FIG. 4 shows the present invention as viewed at the top side 16. In this view of the present invention, the flywheel 28 is rotatably arranged adjacent to the top side 16. The flywheel at the front wall 12 rotates in an opposite direction of the flywheel at the back wall 26. Similarly, the flywheels on sides 14 and 18 rotate in opposite directions.

Figure 5:
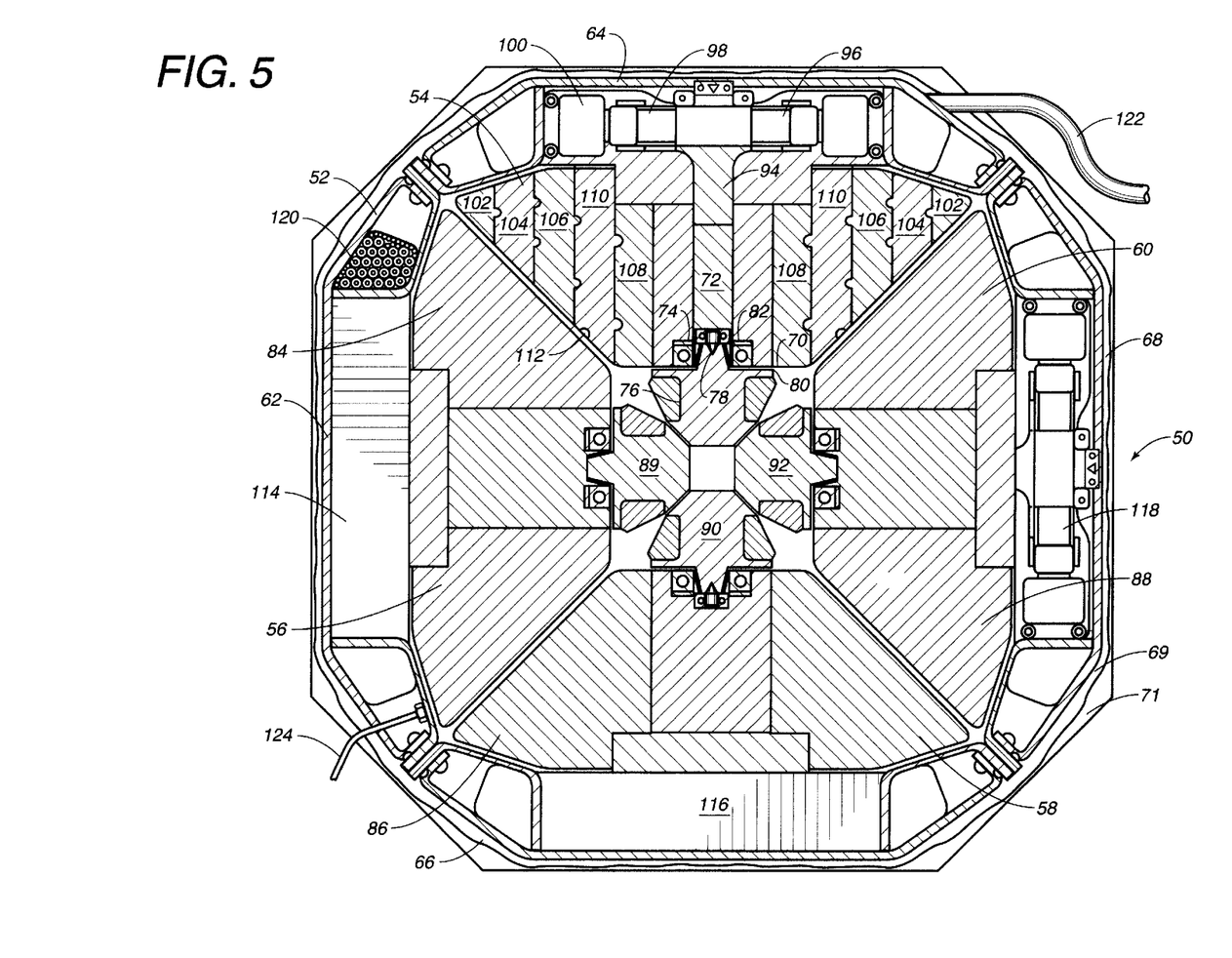
FIG. 5 is a cross-sectional view across one of the axes of the flywheel system of the present invention showing in particular, the internal construction of the flywheel system.

FIG. 5 shows the interior configuration of the flywheel system 50 in accordance with the teachings of the present invention. It should be noted that the flywheel system illustrated in FIG. 5 shows a cross-sectional view across one of the axes of the flywheel system. However, the same illustration would be appropriate as taken across the other axes of the flywheel system of the present invention. As such, the description of each of the flywheels and associated components is applicable to the system as a whole. Initially, the flywheel system 50 has a housing 52 which surrounds the individual flywheels 54, 56, 58 and 60 on the interior of the housing 52. The housing is, ideally, made of a stainless steel mesh or composite material having a thickness of approximately ½ of an inch. The housing 52 is assembled with expandable riveting side 62 at its ends to sides 64 and 66. Similarly, side 64 is assembled with expandable riveting its ends to sides 68 and to side 62. Side 66 is assembled with expandable riveting its ends to the ends of side 62 and side 68. Finally, side 68 is assembled with expandable riveting its ends to the ends of sides 64 and 66. The riveting of these ends together is illustrated, with particularity, in FIG. 5. The rivets are formed of a stainless steel alloy material so as to be able to expand under extreme pressures without breaking.

In FIG. 5, it can be seen that the walls 62, 64, 66 and 68 are surrounded by a latex material 69. The housing 52 is dipped in latex following the assembling of the walls 62, 64, 66 and 68. As such, the latex will enhance the "vacuum conditions" on the interior of the housing 52 and also serve as an expansion device. A stainless steel mesh 71 surrounds the latex layer 69 around the walls 62, 64, 66 and 68 of housing 52. The stainless steel mesh serves to retain the components on the interior of the housing 52 in the event of a disintegration of the flywheels therein. This stainless steel cable or wire mesh will tend to flex and slowly expand in the event of an explosion. As such, the release of shrapnel from the interior of the housing 52 is effectively avoided. The stainless steel cable or wire mesh can be incorporated or replaced with the composites (glass fibers, carbon fibers, or plastic fibers). The same principle will apply in which the proper composite materials so as to form a rigid, yet expandable, frame can be engineered to slowly expand so as to disperse explosion forces and to retain all of the shrapnel within the interior of the housing 52.

As can be seen in FIG. 5, the flywheel 54 has a conicoid configuration. The forward edge 70 of the flywheel 54 has a magnetic component 72 having an indentation 74. A magnetic bearing 76 is located in the central portion of the housing 52. The magnetic bearing 76 has a projection 78 which is received within the indentation 74 of the magnetic portion 72. Under normal circumstances, the forward end 70 of the magnetic component 72 will have a similar pole as the end 80 of the magnetic bearing. As such, the forward edge of the magnetic component 72 will tend to repel the outward edge of the magnetic bearing 80. Small bearings 82 are positioned adjacent to the indentation 74 so as to allow easy rotation of the indentation 74 of the magnetic component 72 around the projection 78 of the magnetic bearing 76. As such, the flywheel 72 is able to achieve relatively friction-free rotation on the interior of the housing 52.

A similar orientation of magnetic bearings and flywheels will occur with the second flywheel 84, the third flywheel 86 and the fourth flywheel 88. For example, flywheel 84 is supported by magnetic bearing 89. Flywheel 86 is supported by magnetic bearing 90. Flywheel 88 is supported by magnetic bearing 92. In view of the relative orientations of the magnetic components of each of the flywheels 84, 86 and 88 with respect to the magnetic bearings 89, 90 and 92, relatively friction-free rotation is achieved.

Flywheel 72 is connected by shaft 94 to motor 96. Suitable bearings can serve to support the shaft 94 relative to the motor 96. These bearings can be ball bearings, or other types of bearings, such as soft metal bearings, air bearings, magnetic bearings, and similar devices. The motor 96 has stampings 98 which are affixed to the shaft 94 so as to rotate with the rotation of the flywheel 72. Windings 100 are affixed within the housing 52 so as to be in proximity to the stampings 60. As such, the flywheel system 50 can act as an electric motor/generator. The electric motor/generator of the flywheel system serves as the kinetic energy input means for the present invention. Each of the flywheels 72, 84, 86 and 88 within the energy storage apparatus 50 has this arrangement of windings 100 and stampings 98.

As can be seen in FIG. 5, the flywheel 72 is formed of a laminated assemblage of plastic and steel rings. The plastic rings 102, 104, 106 and 108 extend circumferentially around the steel ring 110. The plastic ring 108 surrounds the magnetic component 72. This assemblage of plastic rings 102, 104, 106, along with the steel ring 110, serves to prevent injury and damage from flying shrapnel as the result of a collision. Each of the plastic composite or steel rings 102, 104 and 106 serve to isolate the steel ring 110 from the exterior environment. As such, in the event of a collision, the plastic rings 102, 104 and 106 will serve to help brake the system and serve to avoid the release of shrapnel from the interior of housing 52.

The plastic rings 102, 104, 106, 108 and 110 can be particularly configured so as to enhance the safety of the present invention. In particular, innermost rings 108 and 110 can be formed of a more easily disintegratable material. As such, in the event of contact between the flywheels and the walls of the enclosure 52, the innermost rings will disintegrate before the outermost rings. As such, the outward release of shrapnel is effectively prevented. When the innermost rings collapse first, the outermost rings will tend to compress upon the collapsed innermost rings rather than be released with an explosive outwardly directed force.

A balancing element 112 is provided around the periphery of the flywheel 72 so as to allow for minor adjustments to be made in the balance of each of the flywheels. It is important to note that each of the flywheels 84, 86 and 88 has a similar configuration as flywheel 54.

Importantly, each of the motors 96, 114, 116 and 118 is surrounded by an aluminum and steel cable and carbon fiber/resin wrap 120. As such, each of the motors 96, 114, 116 and 118 is rigidly supported on the interior of the housing 52.

A water coolant line 122 provides for the circulation of water around the system so as to appropriately cool the flywheels as they rotate on the interior of housing 52. A vacuum line 124 also extends into the interior of the housing 52, also shown in FIG. 8, so as to appropriately maintain cooling to the bearings, magnetic and motors in a vacuum condition.

In the present invention, the flywheel system 50 has an ability to flex in the event of a collision. In particular, the enclosure is appropriately flexible so that, in the event of a collision, adjacent flywheels will contact each other so as to create a braking effect by the contact of flywheel against flywheel indicating contact at its smallest diameter (also made with braking materials).

Figure 6:
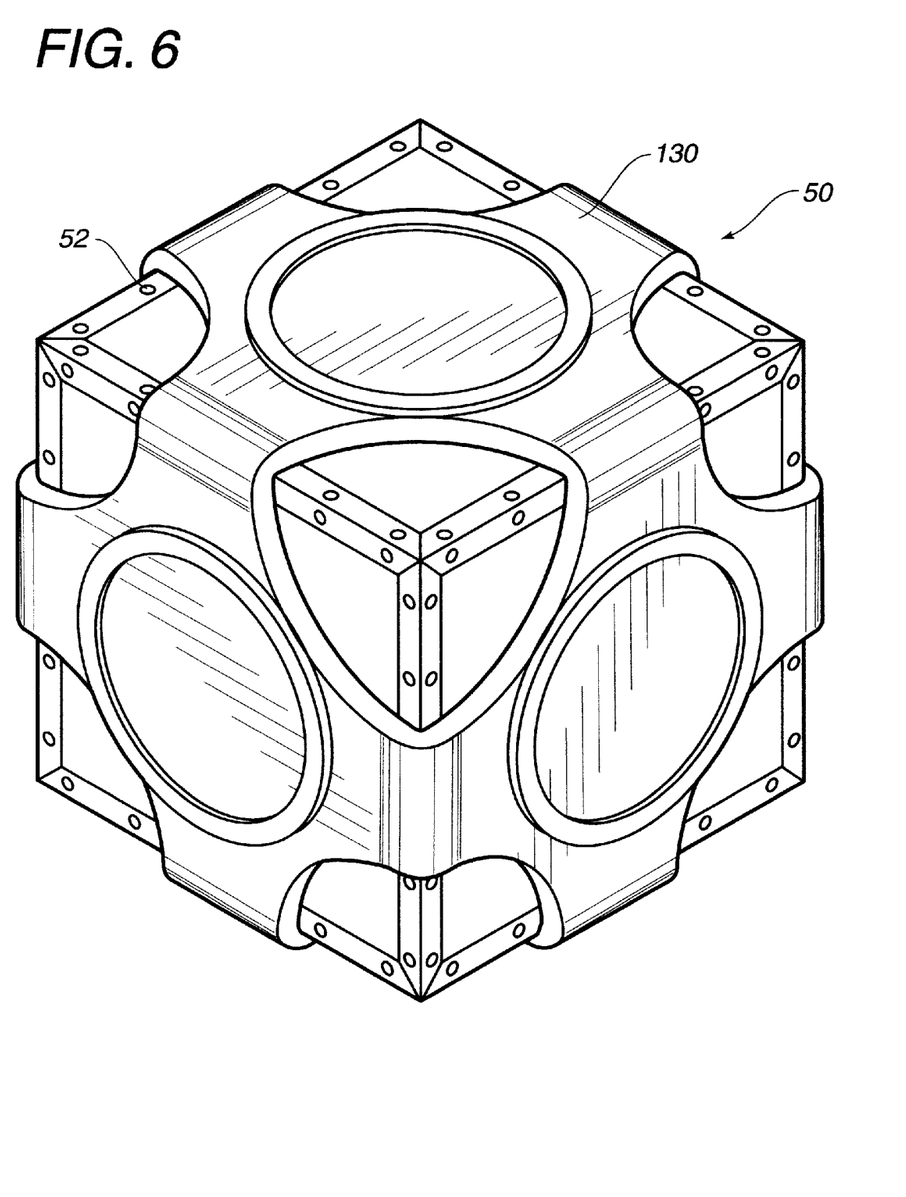
FIG. 6 is an exterior perspective view of the housing of the present invention.

An exterior view of the flywheel system 50 is shown in FIG. 6. It can be seen that the housing 52 includes a plurality of sides which are appropriately rivetted together. An exterior system of steel and carbon fiber resins 130 surrounds each of the sides of the flywheel system 50 so as to prevent the release of fragments in the event of a collision. The flexing characteristics serve to bring the flywheels to a quick stop by making contact between the sides of the flywheels. As such, even though the flywheels are spinning at a very high speed, they can be quickly stopped by surface-to-surface contact. The heat and destruction that occurs within the flywheel system of the present invention is unimportant. Each of the flywheels can be easily replaced. The importance of the design of the housing 52 of the present invention assures that the components will not "fly apart" in the event of a collision.

Figure 7:
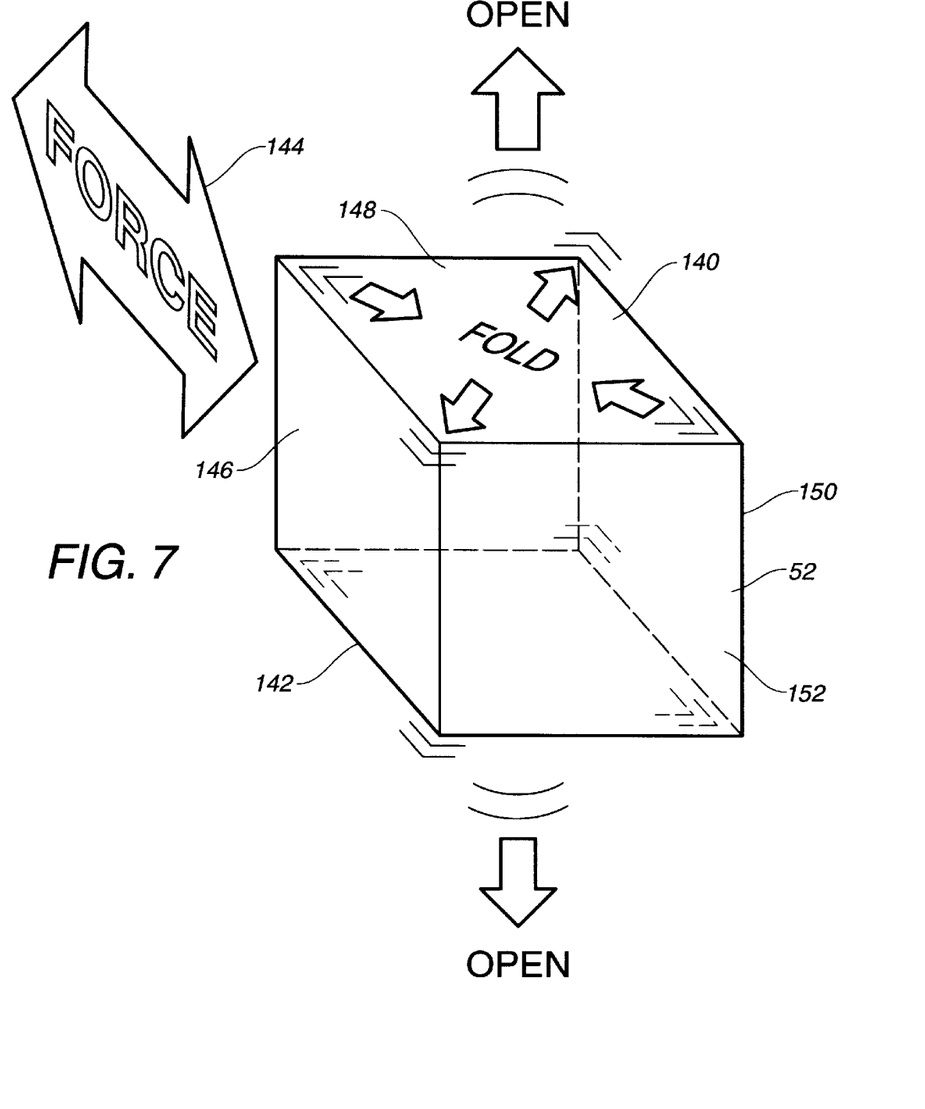
FIG. 7 is a diagrammatic illustration of how the automatic braking system of the present invention will function in the event of an accident.

Referring to FIG. 7, the cubic design of the housing 52 is particularly configured so that the top 140 and the bottom 142 will fold inwardly and open in the event of a collision in which a side force 144 will contact one of the sides 146, 148, 150 and 152 of the housing 52. It can be seen in FIG. 4 that the force 144 strikes on side 146. This will cause the sides to fold inwardly on each other. When this occurs, the flywheels on the interior of housing 52 will come into contact with one another and come to a quick stop. Also, the top 140 and the bottom 142 will open so that any particles that are released will be delivered vertically upwardly or vertically downwardly. In such an arrangement, these shrapnel-like particles will not affect any persons on the interior of the vehicle employing the flywheel system 50 of the present invention.

Figure 8:
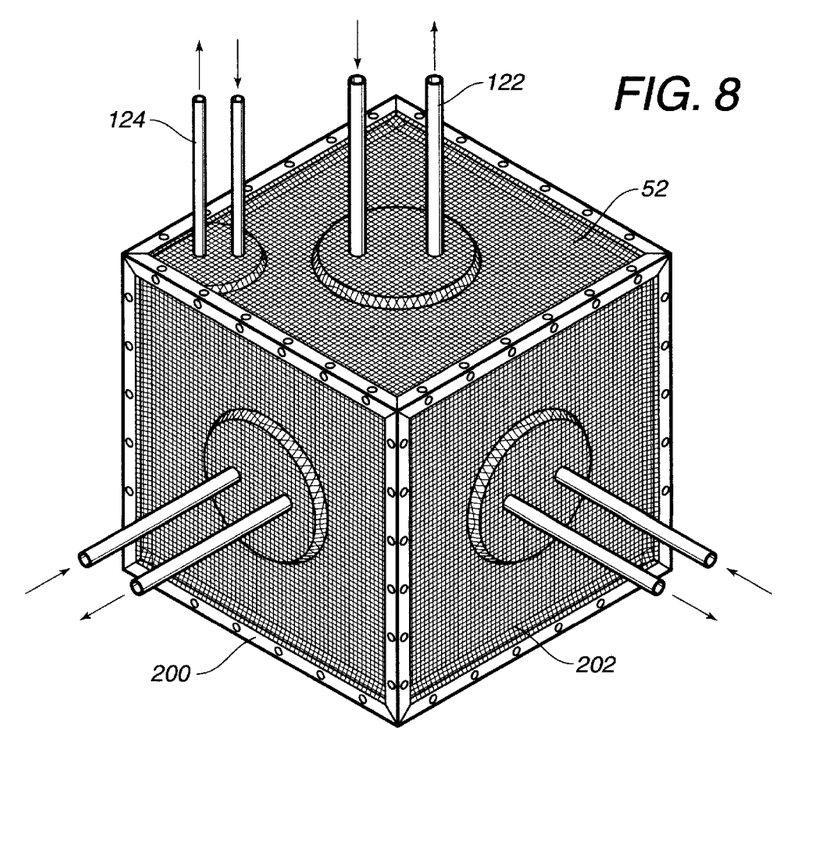
FIG. 8 is a perspective view of the present invention showing a stainless steel wire layered into a composite panel of the energy storage apparatus.

FIG. 8 shows an alternative form of the present invention. In FIG. 8, it can be seen that the housing 200 of the flywheel energy storage device is formed with wire or cable 202. Wire mesh 202 reinforced on all sides of the housing 200. As such, in the event of a destruction of the flywheels on the interior of the housing 200, the wire mesh 202 will tend to stretch so as to keep the enclosure 200 from blowing apart. As such, all of the components will be effectively retained within the enclosure 200 with controlled expansion to prevent its release into a passenger compartment of a vehicle. As such, this form of the invention effectively prevents the release of shrapnel from the interior of the housing 200.

The present invention provides the maximum neutralization of the gyroscopic phenomenon. The cube form of the three-dimensional flywheel assembly can serve as an energy storage apparatus. It is also possible that various twelve-sided forms (instead of cubes) could also be used so as to achieve the same neutralization of the gyroscopic phenomenon. The spinning of the flywheels in opposite directions on the same axis serves to neutralize all gyroscopic effects on that axis. The speed of each flywheel should be in synchronism and the weight of each flywheel should be the same. Since the gyroscopic effect is neutralized per plane-axis, then this three-dimensional arrangement adds gyroscopic neutralization to the entire cube. As such, all possible movements of a moving vehicle or vessel are covered.

The entire unit of the present invention results in a cube-shaped housing having six flywheels. One or more cubes can be interconnected electrically so as to operate like an electro-mechanical battery. Such a battery can be charged and recharged in an unlimited fashion. This electromechanical battery permits regenerative braking, and other leading opportunities, to occur during the operation of the motor vehicle.

It is possible, within the concept of the present invention, that the arrangement of the flywheels could be expanded into a ball-shaped configuration. This can occur when the electrical system can be integrated into the flywheels or into the enclosure. The use of a ball over a cube configuration can lend itself for possible placement inside a pipe. The tubular space inside the pipe can be better used to receive a ball than a cube.

Figure 9:
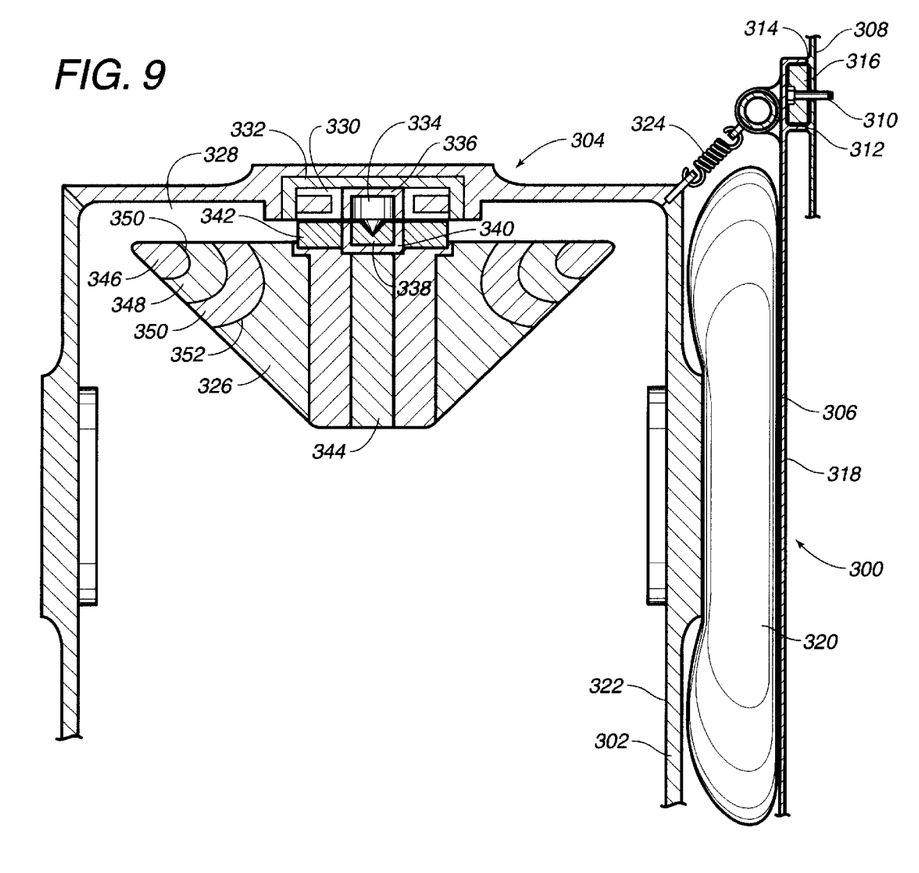
FIG. 9 is a cross-section segmental view of the shock-absorbing techniques used to isolate the flywheels from road shocks to the vehicle.

Referring to FIG. 9, there is shown a shock absorbing system 300 designed so as to receive the housing 302 of the flywheel generator apparatus 304 therein. As can be seen in FIG. 9, a cradle 306 is affixed to the vehicle 308 through the use of a fastener 310. In particular, the fastener 310 can be a bolt or a screw which attaches the frame 312 of cradle 306 directly to the vehicle 308. The frame 312 of the cradle 306 is formed of a rigid member, such as steel or aluminum. Frame 312 includes a well area 314 facing toward the vehicle 308. An elastomeric member 316 is fitted within the well 314 and around the fastener 310. The elastomeric member 316 can be a rubber washer which creates a resilient contact between the frame 312 and the surface of the vehicle 308. As can be seen in FIG. 9, the thickness of the elastomeric member 316 is greater than the depth of the well 314 so that the frame 312 is effectively isolated from the vehicle 308.

The cradle 306 has a generally cubical configuration with a wall 318 affixed to the frame 312. So as to facilitate the shock-absorbing capability, the wall 318 can be formed of a flexible and generally impenetrable material, such as KEVLAR (TM) or a cloth bag coated with latex or rubber. Alternatively, the wall 318 can be formed of steel mesh, plastic or other metals and reinforced with KEVLAR (TM) or the cloth bag coated with latex or rubber.

A shock-absorbing container 320 is affixed to the wall 306 and extends so as to face the wall 322 of the housing 312. This container can be interposed between each of the walls of the cradle 306 and the walls of the housing 322. The shock-absorbing container 320 can be a bag, balloon or bladder which is filled with oil, any other thick fluid, rubber or rubber powder, or any combination thereof. The shock-absorbing container 320 serves to further isolate the wall 302 of housing 322 from the cradle 306.

A spring 324 is connected to a corner of the housing 322 and is also connected to the frame 302 of the cradle 306. This spring will extend downwardly at the corners of the cradle and toward the corners of the housing 322 so as to suspend the housing 322 within the cradle 306.

Another shock-absorbing feature of the present invention is the manner in which the flywheel 326 is connected to the wall 328 of the housing 322. As can be seen, a magnetic bearing 330 is secured within an elastomeric frame 332 within the wall 328 of the housing 322. Additionally, a pin member 334 is secured within another elastomeric frame 336 in the center of the wall 328. Pin 334 will have a pointed end which extends toward the flywheel 326. The flywheel 326 also has a jewel 338 mounted in an elastomeric frame 340 centrally thereof. The jewel 338 will ride adjacent to and around the pin 334. Magnetic bearings 342 will interact with the magnet bearings 330 so as to provide a contact-free rotational movement by the flywheel 326 upon shaft 344.

The flywheel 326 includes a plurality of rings 346, 348 and 350 that are concentrically mounted around the shaft 344. Each of the rings has a convex exterior surface 350 and a concave interior surface 352. As can be seen, that the concave inner surface will engage the convex surface of an adjacent ring. The design of the present invention is that, under extreme forces, each of the rings 346, 348 and 350 will be slippable with respect to an adjacent ring.

As used in the present invention, the flywheels 326 can be made of rings which are of different materials and densities. As such, certain of the rings can act as springs. The rings can be formed in layers of "half-moon" shapes so that in and impact or blow of low intensity, the flywheels will have some "give" in a spring type of absorption. Under normal centrifugal force, the rings will be rigid and remain in place.

Additionally, the flywheel 326 can be hollow or be mercury-filled, or filled with some other liquid. The liquid will allow absorption to an impact force or a strike. If the flywheel does disintegrate, the liquid will allow for a containment of the pieces of the flywheel. A liquid-filled or hollow flywheel will also offer inherent balancing and weight advantages for higher energy storage at given speeds.

In the present invention, the first shock absorbing system is the mounting of the cradle as soft-supported between rubber parts attached to the rigid parts of a vehicle. The cradle carries the housing of the energy storage apparatus. This system, through the rubber supports in an elastomeric manner to the vehicle. The fitting well associated with the frame of the cradle serves to house the rubber doughnut therein so as to prevent undue distortion of the elastomeric member 316 under extreme forces. The cradle is formed of aluminum and steel in a stronger than required semi-flexible frame with expandable panels made of steel mesh, plastic or other materials and reinforced with a strong expandable KEVLAR (TM) or similar material, such as a cloth bag coated with latex or rubber. The cradle is designed to absorb road shock and is also a secondary containment system in the case of a disintegration of the energy storage device 304.

The present invention also uses a hanging system where the housing is supported in the cradle through the use of the spring 324. The bottom, top and sides of the cradle have shock-absorbing containers 320 attached thereto. These containers 320 serve to absorb any and all shocks and vibrations which were not absorbed by the previously described system or by the suspension system.

The shafts and shaft supports within the energy storage apparatus 304 must be strong enough to never jump the bearings 330 and 342 or bend out of center. This is achieved by the raw strength of the materials and the maximum allowed weight of the flywheel and the speed of rotation. Each flywheel and shaft is provided with shock and vibration absorption at the bearings. To accomplish this, the pin and jewel are mounted in rubber. This is combined with the magnetic suspension between the two supports on each side of the flywheel shaft. The pin and jewel is a touchdown support with a tolerance of between 0.001 to 0.002 inches. This permits the flywheel assembly to ride almost friction free in a "no vibration" moment. The pin and jewel elastomeric mounts are expanded to yield about 1/64th of an inch so as to be the gap between the turning flywheels and the flexibility of the permanent magnets mounted on the shaft and the static electro-magnet mounted in the cubic housing. Both the mount of the pin and jewel on both sides of the shaft supporting the rotors and the magnetic bearings are encased in a strong rubber frame encased in steel or ceramic blocks. These are capable of yielding under pressure, inwardly or outwardly, or laterally.

Figure 10:
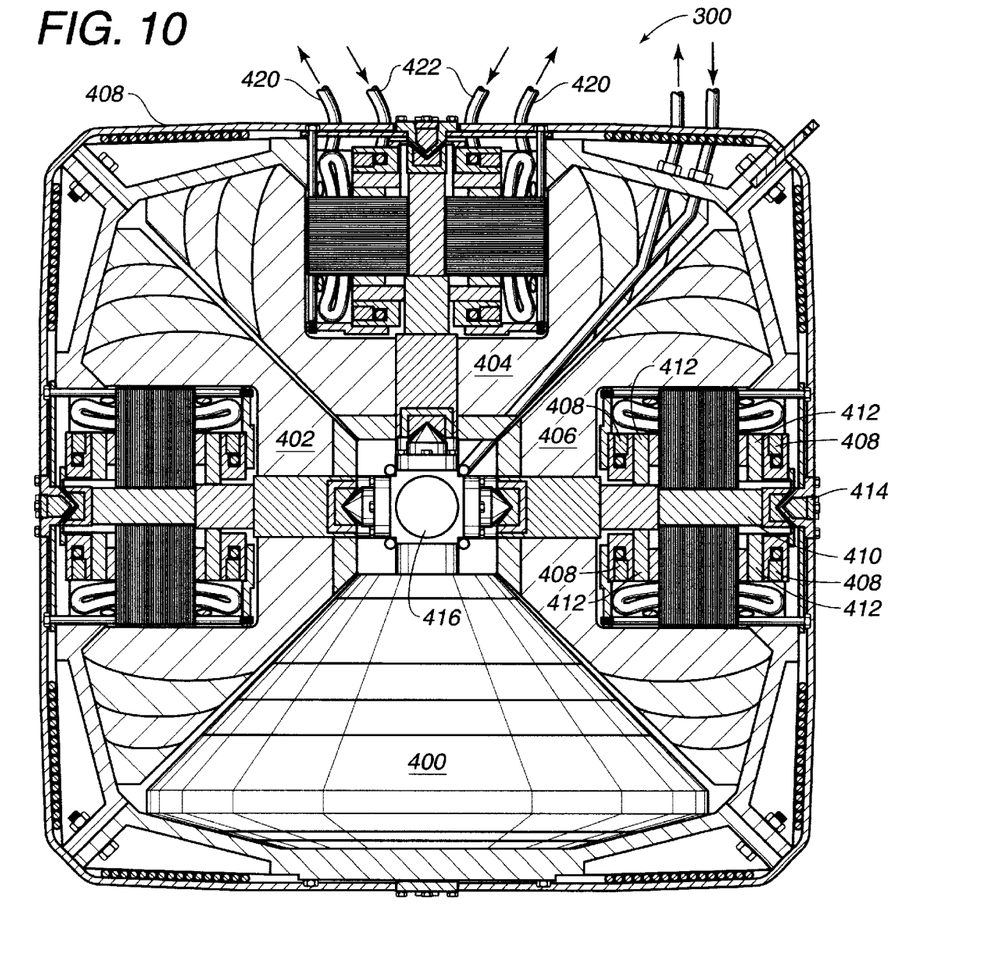
FIG. 10 is a cross-section interior view of the energy storage apparatus of the present invention.

FIG. 10 is an interior view of the flywheel apparatus 300. In particular, it can be seen that flywheels 400, 402, 404 and 406 reside within the interior of housing 408. Each of the flywheels 400, 402, 404 and 406 is formed of a plurality of rings which can "flex" and move laterally in a spring-type action in the event of a burst or a disintegration of the flywheel apparatus 300. It can be seen that each of the flywheels 400, 402, 404 and 406 includes suitable windings so as to provide the means for transmitting energy from the flywheel apparatus 300 or providing energy for the rotation of each of the flywheels. In FIG. 10, it can be seen that electromagnets 408 are positioned adjacent to shaft 410 associated with the flywheel 406. The same arrangement exists for the other flywheels 400, 402, and 404. Magnets 412 provide the magnetic bearing support for the shaft 410. A suitable pin 414 interacts with jewel 416 so as to provide the point of rotation of the flywheel 406 about the shaft 410.

In FIG. 10, it can be seen that there is a malleable center core 416 and a bearing support that can yield under the pressure of a blow or strike to the housing 408. This malleable center core 416 will cause the respective flywheels 400, 402, 404 and 406 to "jam" together, to make contact, and to decelerate. This contact will first occur at the smallest diameter of the respective flywheels.

FIG. 10 further shows that coolant lines 420 pass cooling fluid from the interior of the windings associated with each of the flywheels. Coolant lines 422 illustrate that the cooling fluid is delivered into the interior of such windings.

Figure 11:
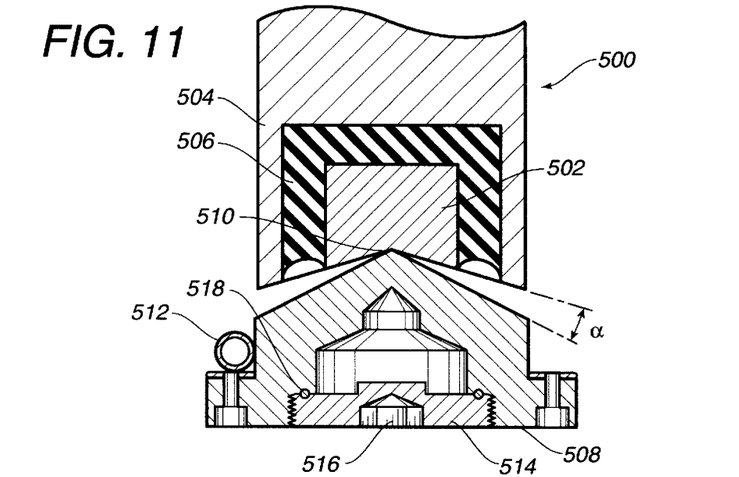
FIG. 11 is a detailed view of the pin-and-jewel connection of the flywheel to the housing.

FIG. 11 shows a detailed view of an individual pin-and-jewel arrangement 500. Initially, it can be seen that the jewel 502 is supported on a shaft 504 within a rubber shock-absorbing material 506. The jewel 502 is aluminum or an oxide-like ceramic material. The pin 508 includes a pointed end 510 which is received within the open end of the jewel 502. The angle α between the pin 508 and the jewel 502 would be set so as to optimize the performance of the flywheels. The pin 508 is formed of a steel material which will bend but not fracture. A cooling duct 512 extends around the pin 508 so as to act as a heat exchange medium. A lid 514 is fitted into the end of the pin 508. An allen-wrench hole 516 is formed at the end of the lid 514 so as to allow the lid to be inserted into the pin 508. An O-ring seal 518 is interposed between the lid 514 and the pin 508. The lid 514 can retain grease within the pin.

Figure 12:
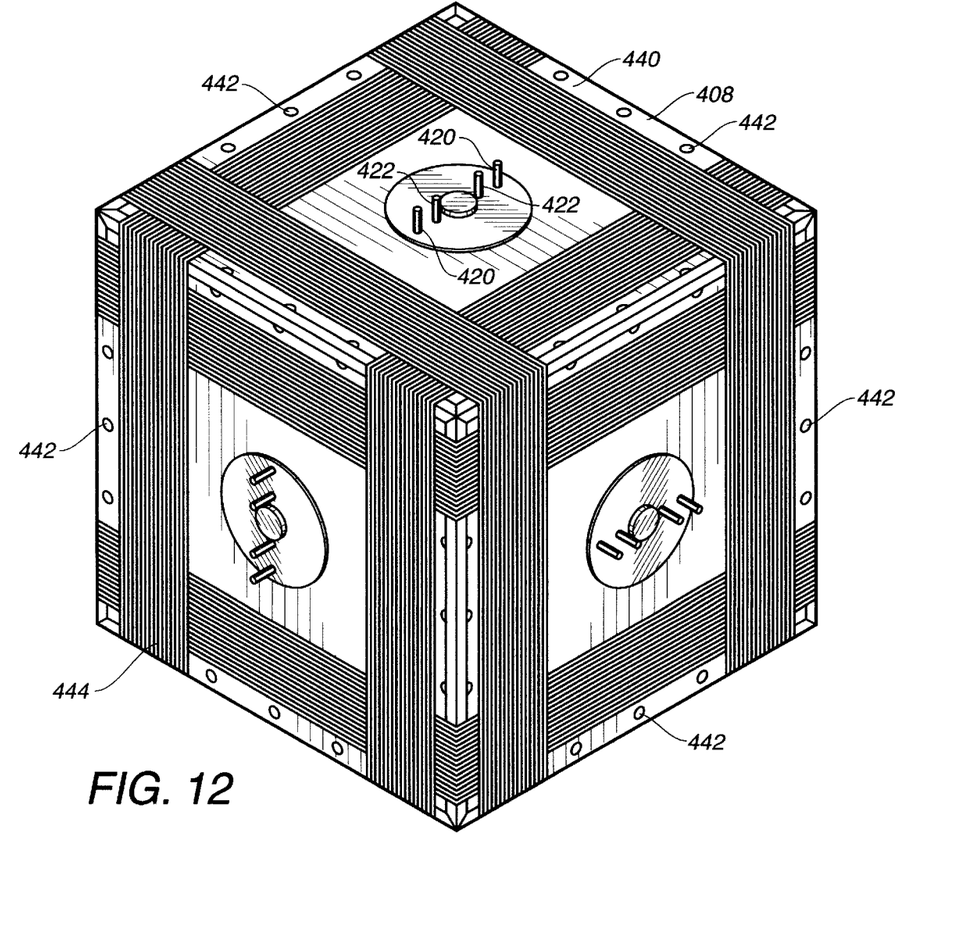
FIG. 12 is a perspective view of the exterior of the housing of the energy storage apparatus of the present invention.

FIG. 12 shows an exterior view of the housing 408. As can be seen, the housing 408 includes cooling lines 420 which serve to deliver the cooling fluid from the windings of the respective flywheel. The cooling lines 422 extend outwardly from the side 440 so as to allow for the passage of cooling fluid into the housing 408. It can be seen that these cooling lines appear on each of the sides of the housing 408. Each of the sides of the housing 408 is connected to an adjacent housing through the use of expandable rivets 442 (described herein previously). A stainless steel cable safety winding 444 extends around the housing 408 so as to prevent the explosion of the housing 408 in the event of a collision or a burst.

The present invention also includes another form of shock absorption by manufacturing the flywheels to distort and to absorb a certain amount of change in angular momentum before disintegrating. The flywheels are formed in rings in which different materials with high strength fiber strands are wound. The rings, upon sufficient rotational force, may slip between themselves. The shaping of the outer diameter of the rings in a channel or circular cupping form allows a small rotation of the outer ring and return to the original shape in a bending yield without damaging themselves or adjacent rings.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. An apparatus comprising:
   a vehicle;
   a housing resiliently mounted in said vehicle;
   a first pair of flywheels rotatable about a first axis within said housing;
   a second pair of flywheels rotatable about a second axis within said housing;
   a third pair of flywheels rotatable about a third axis within said housing, each flywheel of said first pair being rotatable in opposite directions, each flywheel of said second pair being rotatable in opposite directions, each flywheel of said third pair being rotatable in opposite directions, each of said first, second and third axes being perpendicular to each other;
   an energy input means connected to at least one of the flywheels for initiating and maintaining rotational movement of the flywheels;
   an output means for converting the rotation of the flywheels into potential energy; and
   a cradle connected to said vehicle, said housing being received within said cradle, said cradle being mounted to said vehicle by a fastener with an elastomeric member interposed between said cradle and said vehicle.

2. The apparatus of claim 1, said cradle having a rigid well formed on an exterior surface thereof, said rigid well receiving said elastomeric member therein.

3. An apparatus comprising:
   a vehicle;
   a housing resiliently mounted in said vehicle;
   a first pair of flywheels rotatable about a first axis within said housing;
   a second pair of flywheels rotatable about a second axis within said housing;
   a third pair of flywheels rotatable about a third axis within said housing, each flywheel of said first pair being rotatable in opposite directions, each flywheel of said second pair being rotatable in opposite directions, each flywheel of said third pair being rotatable in opposite directions, each of said first, second and third axes being perpendicular to each other;
   an energy input means connected to at least one of the flywheels for initiating and maintaining rotational movement of the flywheels;
   an output means for converting the rotation of the flywheels into potential energy;
   a cradle connected to said vehicle, said housing being received within said cradle; and
   a spring extending from said cradle and engaging said housing so as to suspend said housing within said cradle such that walls of said housing do not contact walls of said cradle.

4. The apparatus of claim 3, further comprising:
   a shock-absorbing container interposed between a wall of said housing and a wall of said cradle.

5. An apparatus comprising:
   a vehicle;
   a housing resiliently mounted in said vehicle;
   a first pair of flywheels rotatable about a first axis within said housing;
   a second pair of flywheels rotatable about a second axis within said housing;
   a third pair of flywheels rotatable about a third axis within said housing, each flywheel of said first pair being rotatable in opposite directions, each flywheel of said second pair being rotatable in opposite directions, each flywheel of said third pair being rotatable in opposite directions, each of said first, second and third axes being perpendicular to each other;
   an energy input means connected to at least one of the flywheels for initiating and maintaining rotational movement of the flywheels;
   an output means for converting the rotation of the flywheels into potential energy; and
   a cradle connected to said vehicle, said housing being received within said cradle, said cradle having a cubical configuration with a frame formed of a rigid material, said cradle having a wall affixed to said frame, said wall being formed of a flexible and generally impenetrable material.

6. An apparatus comprising:
   a vehicle;
   a housing resiliently mounted in said vehicle;
   a first pair of flywheels rotatable about a first axis within said housing;
   a second pair of flywheels rotatable about a second axis within said housing;
   a third pair of flywheels rotatable about a third axis within said housing, each flywheel of said first pair being rotatable in opposite directions, each flywheel of said second pair being rotatable in opposite directions, each flywheel of said third pair being rotatable in opposite directions, each of said first, second and third axes being perpendicular to each other;
   an energy input means connected to at least one of the flywheels for initiating and maintaining rotational movement of the flywheels; and
   an output means for converting the rotation of the flywheels into potential energy, each of the flywheels being rotatably mounted on a magnetic bearing, said magnetic bearing being affixed within an elastomeric lining on a wall of said housing, said housing having a pin positioned centrally of said magnetic bearing, the flywheel having a jewel positioned centrally thereof so as to ride in close proximity over and around said pin during a rotation of the flywheel.

7. The apparatus of claim 6, said pin having an elastomeric frame extending therearound, said jewel being supported in an elastomeric frame in the flywheel.

8. An apparatus comprising:
   a vehicle;
   a housing resiliently mounted in said vehicle;
   a first pair of flywheels rotatable about a first axis within said housing;
   a second pair of flywheels rotatable about a second axis within said housing;

a third pair of flywheels rotatable about a third axis within said housing, each flywheel of said first pair being rotatable in opposite directions, each flywheel of said second pair being rotatable in opposite directions, each flywheel of said third pair being rotatable in opposite directions, each of said first, second and third axes being perpendicular to each other;

an energy input means connected to at least one of the flywheels for initiating and maintaining rotational movement of the flywheels; and an output means for converting the rotation of the flywheels into potential energy, each of the flywheels comprising a plurality of rings arranged concentrically with respect to each other, each of said plurality of rings having a convex exterior surface and a concave inner surface such that the concave surface of one ring engages the convex surface of an adjacent ring, each of said plurality of rings being slippable in rotation with respect to an adjacent ring.

* * * * *